US011968647B2

(12) United States Patent
Hakola et al.

(10) Patent No.: US 11,968,647 B2
(45) Date of Patent: Apr. 23, 2024

(54) FACILITATING DOWNLINK CONTROL INFORMATION (DCI) REPETITION ON LINKED PHYSICAL DOWNLINK CONTROL CHANNEL (PDCCH) CANDIDATES OF DIFFERENT SEARCH SPACE SETS

(71) Applicant: Nokia Technologies Oy, Espoo (FI)

(72) Inventors: Sami-Jukka Hakola, Kempele (FI); Keeth Saliya Jayasinghe Laddu, Espoo (FI); Matha Deghel, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 339 days.

(21) Appl. No.: 17/550,571

(22) Filed: Dec. 14, 2021

(65) Prior Publication Data
US 2022/0225284 A1 Jul. 14, 2022

Related U.S. Application Data

(60) Provisional application No. 63/136,465, filed on Jan. 12, 2021.

(51) Int. Cl.
H04W 72/02 (2009.01)
H04W 24/08 (2009.01)
(Continued)

(52) U.S. Cl.
CPC ........... *H04W 72/02* (2013.01); *H04W 24/08* (2013.01); *H04W 72/0446* (2013.01); *H04W 72/1263* (2013.01); *H04W 72/23* (2023.01)

(58) Field of Classification Search
CPC . H04W 72/02; H04W 24/08; H04W 72/0446; H04W 72/1263; H04W 72/23;
(Continued)

(56) References Cited

U.S. PATENT DOCUMENTS

2019/0297605 A1   9/2019   Kim et al.
2020/0022144 A1   1/2020   Papasakellariou
(Continued)

FOREIGN PATENT DOCUMENTS

CN   109587729 A   4/2019
CN   110536451 A   12/2019
(Continued)

OTHER PUBLICATIONS

Extended European Search Report received for corresponding European Patent Application No. 21214261.6, dated May 30, 2022, 9 pages.
(Continued)

Primary Examiner — Fred A Casca
(74) Attorney, Agent, or Firm — SQUIRE PATTON BOGGS (US) LLP

(57) ABSTRACT

Certain example embodiments provide systems, methods, apparatuses, and computer program products for facilitating downlink control information (DCI) repetition on linked physical downlink control channel (PDCCH) candidates of different search space sets. For example, certain embodiments may provide a procedure for a network node or a user equipment (UE) to determine a set of PDCCH candidates for determining starting time and ending time instances for the PDCCH transmission utilizing the repetition of the DCI.

18 Claims, 7 Drawing Sheets

(51) Int. Cl.
*H04W 72/0446* (2023.01)
*H04W 72/1263* (2023.01)
*H04W 72/23* (2023.01)

(58) Field of Classification Search
CPC ... H04L 5/0064; H04L 5/0053; H04L 5/0058; H04L 5/0023
See application file for complete search history.

(56) References Cited

U.S. PATENT DOCUMENTS

| | | | |
|---|---|---|---|
| 2020/0053580 A1 | 2/2020 | Bagheri et al. | |
| 2020/0196346 A1 | 6/2020 | Khoshnevisan et al. | |
| 2020/0322929 A1 | 10/2020 | Bagheri et al. | |
| 2021/0385826 A1 | 12/2021 | Moon et al. | |
| 2022/0038207 A1* | 2/2022 | Frenne | H04L 1/0072 |
| 2022/0039140 A1* | 2/2022 | Yi | H04L 1/08 |
| 2022/0070704 A1* | 3/2022 | Khoshnevisan | H04L 27/2602 |

FOREIGN PATENT DOCUMENTS

| | | |
|---|---|---|
| CN | 112204907 A | 1/2021 |
| WO | 2019/139955 A1 | 7/2019 |
| WO | 2020/064512 A1 | 4/2020 |

OTHER PUBLICATIONS

"Discussion on enhancements on multi-TRP/panel for PDCCH, PUCCH and PUSCH", 3GPP TSG RAN WG1 Meeting #102e, R1-2005684, Agenda: 8.1.2.1, CATT, Aug. 17-28, 2020, 8 pages.

"Search space design and related issues", 3GPP TSG RAN WG1 Meeting #92Bis, R1-1805263, Agenda: 7.1.3.1.2, ZTE, Apr. 16-20, 2018, pp. 1-18.

"New WID: Further enhancements on MIMO for NR", 3GPP TSG RAN Meeting #86, RP-193133, Agenda: 9.1.1, Samsung, Dec. 9-12, 2019, 5 pages.

Takeda et al., "Understanding the Heart of the 5G Air Interface: An Overview of Physical Downlink Control Channel for 5G New Radio", IEEE Communications Standards Magazine, vol. 4, No. 3, Sep. 2020, pp. 22-29.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

International Search Report and Written Opinion received for corresponding Patent Cooperation Treaty Application No. PCT/FI2021/050871, dated Apr. 12, 2022, 16 pages.

"Summary of email discussions [103-e-NR-feMIMO-02] for mTRP PDCCH enhancements", 3GPP TSG-RAN WG1 Meeting #103-e, R1-2009683, Agenda: 8.1.2.1, Qualcomm, Oct. 26-Nov. 13, 2020, 73 pages.

"3rd Generation Partnership Project; Technical Specification Group Radio Access Network; NR; Physical layer procedures for control (Release 16)", 3GPP TS 38.213, V16.4.0, Dec. 2020, pp. 1-181.

"Enhancements for Multi-TRP URLLC schemes", 3GPP TSG RAN WG1 #104-e Meeting, R1-2101006, Agenda: 8.1.2.1, Nokia, Jan. 25-Feb. 5, 2021, 22 pages.

Search Report received for Taiwan Patent Application No. 111100431, dated Sep. 13, 2022, 20 pages of office action and 6 pages of office action translation available.

"3rd Generation Partnership Project; Technical Specification Group Radio Access Network; NR; Physical layer procedures for control (Release 16)", 3GPP TS 38.213, V16.3.0, Sep. 2020, pp. 1-179.

"3rd Generation Partnership Project; Technical Specification Group Radio Access Network; NR; Physical layer procedures for data (Release 17)", 3GPP TS 38.214, V17.0.0, Dec. 2021, pp. 1-217.

Office action received for corresponding Chinese Patent Application No. 202210008408.8, dated Dec. 26, 2023, 7 pages of office action and 5 pages of office action translation available.

* cited by examiner

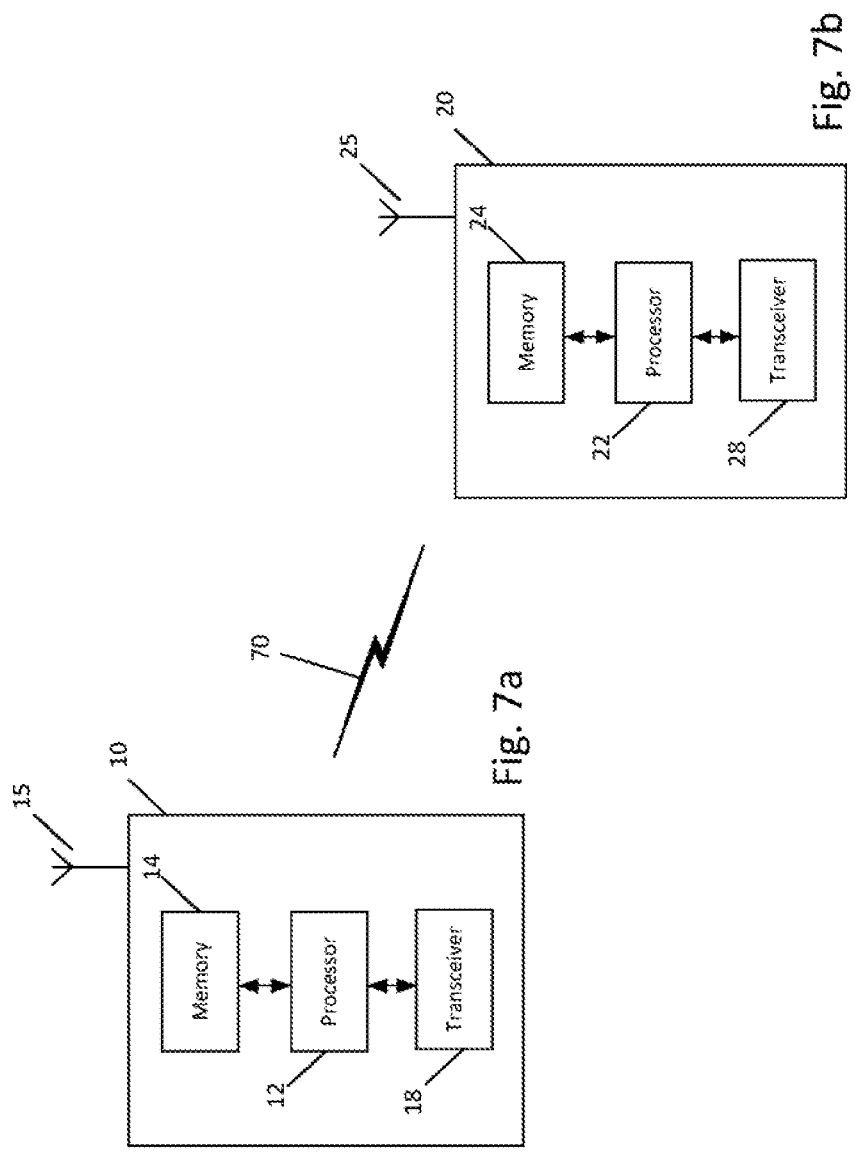

FACILITATING DOWNLINK CONTROL INFORMATION (DCI) REPETITION ON LINKED PHYSICAL DOWNLINK CONTROL CHANNEL (PDCCH) CANDIDATES OF DIFFERENT SEARCH SPACE SETS

RELATED APPLICATION

The present application claims priority from U.S. Provisional Application No. 63/136,465, filed 12 Jan. 2021.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for facilitating downlink control information (DCI) repetition on linked physical downlink control channel (PDCCH) candidates of different search space sets. Additionally, or alternatively, certain embodiments may relate to systems and/or methods for repetition and/or beam diversity for the PDCCH transmissions.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G is mostly built on a new radio (NR), but a 5G network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include selecting a set of physical downlink control channel candidates from a first set of physical downlink control channel candidates and a second set of physical downlink control channel candidates configured for repeated physical downlink control channel transmission. The method may include determining a scheduling offset or a scheduling order for a transmission scheduled by a downlink control information in the first set of physical downlink control channel candidates and the second set of physical downlink control channel candidates based on the selected set of physical downlink control channel candidates.

The method may include detecting or performing the transmission based on the determined scheduling offset or the determined scheduling order. In some embodiments, the selecting may be based on an index of a search space set for detecting the first set of physical downlink control channel candidates and an index of a search space set for detecting the second set of physical downlink control channel candidates. Additionally, or alternatively, the selecting may be based on an index of a control resource set for detecting the first set of physical downlink control channel candidates and an index of a control resource set for detecting the second set of physical downlink control channel candidates.

Additionally, or alternatively, the selecting may be based on a time from a monitoring occasion of the first set of physical downlink control channel candidates to a following monitoring occasion of the second set of physical downlink control channel candidates and a time from a monitoring occasion of the second set of physical downlink control channel candidates to a following monitoring occasion of the first set of physical downlink control channel candidates. Additionally, or alternatively, the selecting may be based on an order in time for a monitoring occasion of the first set of physical downlink control channel candidates and a monitoring occasion of the second set of physical downlink control channel candidates within a given time window. Additionally, or alternatively, the selecting may be based on an index of a starting resource for detecting the first set of physical downlink control channel candidates and an index of a starting resource for detecting the second set of physical downlink control channel candidates.

In a variant, the selecting may include selecting the first set for determining the scheduling order or selecting the second set for determining the scheduling offset based on the index of the search space set for detecting the first set being a lower value compared to the index of the search space set for detecting the second set. In a variant, the selecting may include selecting the first set based on the index of the control resource set for detecting the first set being a lower value compared to the index of the control resource set for detecting the second set. In a variant, the selecting may include selecting the first set based on the time from the monitoring occasion of the first set to the following monitoring occasion of the second set being less than the time from the monitoring occasion of the second set to the following monitoring occasion of the first set. In a variant, the selecting may include selecting the first set based on the monitoring occasion of the first set being earlier compared to the monitoring occasion of the second set within the given time window.

In a variant, the selecting may include selecting the first set based on the index of the starting resource for detecting the first set being a higher value compared to the index of the starting resource for detecting the second set. In a variant, the selecting may include selecting the first set based on the index of the starting resource for detecting the first set being a lower value compared to the index of the starting resource for detecting the second set. In a variant, the method may further include determining a quasi-co-location assumption for the transmission based on the determined scheduling offset. In a variant, the method may further include determining that the first and second set are valid for repeated physical downlink control channel transmission, and the selecting may be performed based on the validity determination. In a variant, the determining may include determining the scheduling offset or the scheduling order based on a starting time instance for the selected set.

According to a second embodiment, an apparatus including at least one processor and at least one memory comprising computer program code. The at least one memory and computer program code may be configured, with the at least one processor, to cause the apparatus at least to select a set of physical downlink control channel candidates from a first set of physical downlink control channel candidates and a second set of physical downlink control channel candidates configured for repeated physical downlink control channel transmission. The at least one memory and computer program code may be configured, with the at least one processor, to cause the apparatus at least to determine a scheduling offset or a scheduling order for a transmission scheduled by a downlink control information in the first set of physical downlink control channel candidates and the second set of physical downlink control channel candidates based on the selected set of physical downlink control channel candidates.

The at least one memory and computer program code may be configured, with the at least one processor, to cause the apparatus at least to detect or perform the transmission based on the determined scheduling offset or the determined scheduling order. In some embodiments, the selecting may be based on an index of a search space set for detecting the first set of physical downlink control channel candidates and an index of a search space set for detecting the second set of physical downlink control channel candidates. Additionally, or alternatively, the selecting may be based on an index of a control resource set for detecting the first set of physical downlink control channel candidates and an index of a control resource set for detecting the second set of physical downlink control channel candidates.

Additionally, or alternatively, the selecting may be based on a time from a monitoring occasion of the first set of physical downlink control channel candidates to a following monitoring occasion of the second set of physical downlink control channel candidates and a time from a monitoring occasion of the second set of physical downlink control channel candidates to a following monitoring occasion of the first set of physical downlink control channel candidates. Additionally, or alternatively, the selecting may be based on an order in time for a monitoring occasion of the first set of physical downlink control channel candidates and a monitoring occasion of the second set of physical downlink control channel candidates within a given time window. Additionally, or alternatively, the selecting may be based on an index of a starting resource for detecting the first set of physical downlink control channel candidates and an index of a starting resource for detecting the second set of physical downlink control channel candidates.

In a variant, the selecting may include selecting the first set for determining the scheduling order or selecting the second set for determining the scheduling offset based on the index of the search space set for detecting the first set being a lower value compared to the index of the search space set for detecting the second set. In a variant, the selecting may include selecting the first set based on the index of the control resource set for detecting the first set being a lower value compared to the index of the control resource set for detecting the second set. In a variant, the selecting may include selecting the first set based on the time from the monitoring occasion of the first set to the following monitoring occasion of the second set being less than the time from the monitoring occasion of the second set to the following monitoring occasion of the first set. In a variant, the selecting may include selecting the first set based on the monitoring occasion of the first set being earlier compared to the monitoring occasion of the second set within the given time window.

In a variant, the selecting may include selecting the first set based on the index of the starting resource for detecting the first set being a higher value compared to the index of the starting resource for detecting the second set. In a variant, the selecting may include selecting the first set based on the index of the starting resource for detecting the first set being a lower value compared to the index of the starting resource for detecting the second set. In a variant, the method may further include determining a quasi-co-location assumption for the transmission based on the determined scheduling offset. In a variant, the method may further include determining that the first and second set are valid for repeated physical downlink control channel transmission, and the selecting may be performed based on the validity determination. In a variant, the determining may include determining the scheduling offset or the scheduling order based on a starting time instance for the selected set.

A third embodiment may be directed to an apparatus that may include circuitry configured to cause the apparatus to perform the method according to the first embodiment, or any of the variants discussed above.

A fourth embodiment may be directed to an apparatus that may include means for performing the method according to the first embodiment, or any of the variants discussed above. Examples of the means may include one or more processors, memory, and/or computer program codes for causing the performance of the operation.

A fifth embodiment may be directed to a computer readable medium comprising program instructions stored thereon for causing an apparatus to perform at least the method according to the first embodiment, or any of the variants discussed above.

A sixth embodiment may be directed to a computer program product encoding instructions for causing an apparatus to perform at least the method according to the first embodiment, or any of the variants discussed above.

BRIEF DESCRIPTION OF THE DRAWINGS

For proper understanding of example embodiments, reference should be made to the accompanying drawings, wherein:

FIG. 7a illustrates an example block diagram of an apparatus, according to an embodiment; and FIG. 7b illustrates an example block diagram of an apparatus, according to another embodiment.

DETAILED DESCRIPTION

Figure 1:
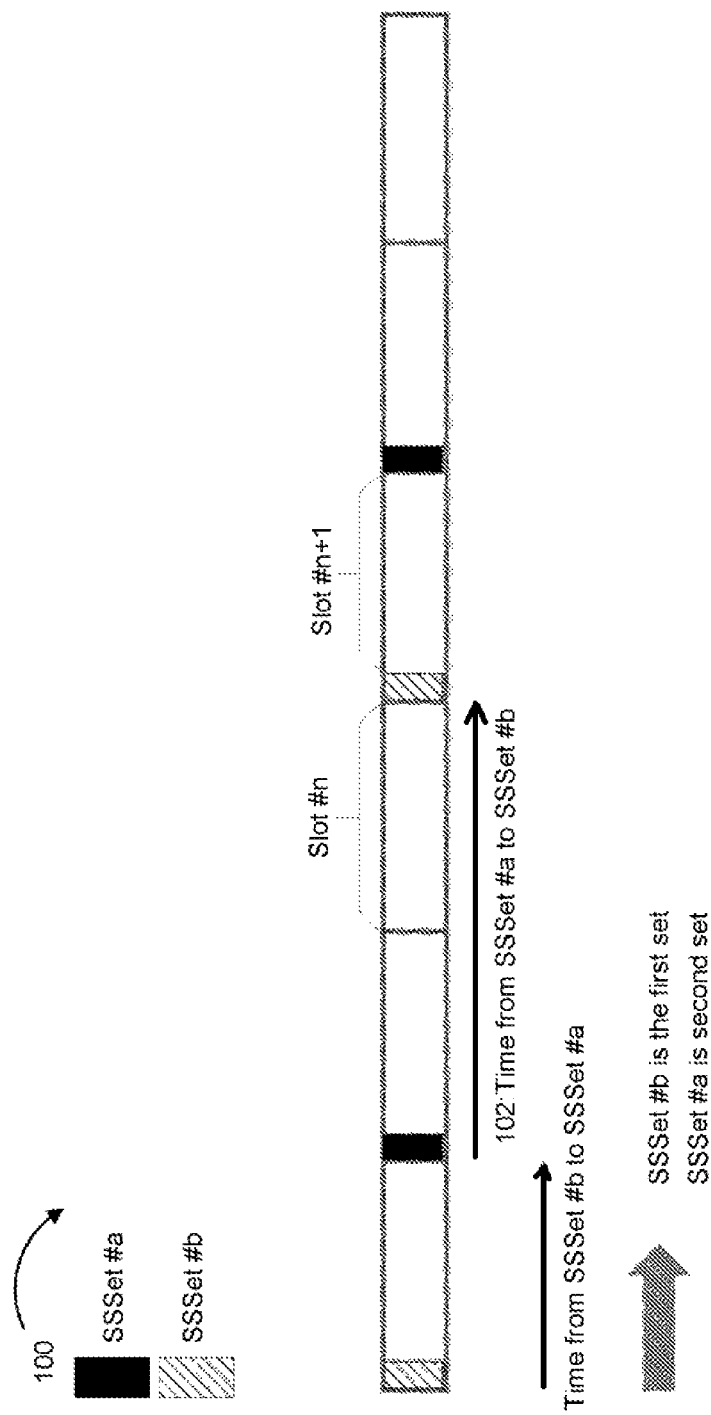
FIG. 1 illustrates a first example of determining first and second sets of PDCCH candidates, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for facilitating DCI repetition on linked PDCCH candidates of different search space sets is not intended to limit the scope of certain embodiments but is representative of selected example embodiments. Additionally, or alternatively, the following detailed description of some example embodiments of systems, methods, apparatuses, and computer program products for repetition and/or beam diversity for PDDCH transmissions is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

From the physical layer perspective, the data and signalling messages in NR may be carried in the downlink (DL) and uplink (UL) physical channels. Among these channels, the PDCCH may have a role in, for example, DL scheduling assignments, UL scheduling grants, and special purpose operations, such as slot format indication, pre-emption indication, and power control. The PDCCH in NR may carry DCI. DCI may comprise the scheduling information for the UL or DL data channels and other control information for one UE or a group of UEs.

With respect to the procedure for generating PDCCH, if the size of the DCI format is less than 12 bits, a few zero padding bits may be appended until the payload size equals 12 bits. For the DCI payload bits, a 24-bit cyclic redundancy check (CRC) may be calculated and appended to the payload. The CRC may allow the UE to detect the presence of errors in the decoded DCI payload bits. After the CRC is attached, the last 16 CRC bits may be masked with a corresponding identifier, referred to as a radio network temporary identifier (RNTI). Using the RNTI mask, the UE can detect the DCI for its unicast data and distinguish sets of DCIs with different purposes that have the same payload size. The CRC attached bits may then be interleaved to distribute the CRC bits among the information bits. The interleaver may support an input size of up to 164 bits. This may mean that DCI without CRC can have up to 140 payload bits. The bits may then be encoded by the polar encoder to protect the DCI against errors during transmission. The encoder output may be processed using a sub-block interleaver, and then may be rate matched to fit the allocated payload resource elements (REs) of the DCI.

The payload bits of each DCI may be separately scrambled by a scrambling sequence generated from a length-31 Gold sequence. The scrambling sequence may be initialized by the physical layer cell identity of the cell or by a UE-specific scrambling identity and a UE-specific cell RNTI (C-RNTI). After the scrambled DCI bit sequence is quadrature phase shift keying (QPSK) modulated, the complex-valued modulation symbols may be mapped to physical resources in units referred to as control channel elements (CCEs). Each CCE may comprise six resource element groups (REGs), where a REG may be defined as one physical resource block (PRB) in one orthogonal frequency-division multiplexing (OFDM) symbol which may comprise nine REs for the PDCCH payload and three demodulation reference signal (DMRS) resource elements (REs). For each DCI, 1, 2, 4, 8, or 16 CCEs can be allocated, where the number of CCEs for a DCI may be denoted as an aggregation level (AL). With QPSK modulation, a CCE may contain 54 payload REs and, therefore, can carry 108 bits. This may result in the output size of the rate matching block being L·108, where L is the associated AL. Based on the channel environment and available resources, a gNB can adaptively choose a proper AL for a DCI to adjust the code rate.

A DCI with AL L may be mapped to physical resources in a given bandwidth part (BWP), where parameters such as frequency and time domain resources, and scrambling sequence identity for the demodulation reference signal (DMRS) for the PDCCH, may be configured to a UE by means of control resource sets (CORESETs). A UE may be configured with up to three CORESETs and up to five CORESETs for multi-DCI multi-transmission and reception point (TRP) operation on each of up to four BWPs on a serving cell. CORESETs may be configured in units of six PRBs on a six PRB frequency grid and one, two, or three consecutive OFDM symbols in the time domain.

A DCI of AL L may comprise L continuously numbered CCEs, and the CCEs may be mapped on a number of REGs in a CORESET. NR may support distributed and localized resource allocation for a DCI in a CORESET. This may be done by configuring interleaved or non-interleaved CCE-to-REG mapping for each CORESET. For interleaved CCE-to-REG mapping, REG bundles constituting the CCEs for a PDCCH may be distributed in the frequency domain in units of REG bundles. A REG bundle may be a set of indivisible resources comprising neighboring REGs. A REG bundle may span across OFDM symbols for the given CORESET. Once the REGs corresponding to a PDCCH are determined, the modulated symbols of the PDCCH may be mapped to the REs of the determined REGs in the frequency domain first and the time domain second, e.g., in increasing order of the RE index and symbol index, respectively.

The UE may perform blind decoding for a set of PDCCH candidates. PDCCH candidates to be monitored may be configured for a UE by means of search space (SS) sets.

There may be various SS set types: common SS (CSS) set, which may be commonly monitored by a group of UEs in the cell, and UE-specific SS (USS) set, which may be monitored by an individual UE. A UE may be configured with up to 10 SS sets each for up to four BWPs in a serving cell. A SS set configuration may provide a UE with the SS set type (CSS set or USS set), DCI format(s) to be monitored, monitoring occasion, and the number of PDCCH candidates for each AL in the SS set.

A SS set with index s may be associated with just one CORESET with index p. The UE may determine the slot for monitoring the SS set with index s based on the higher layer parameters for periodicity k, offset o, and duration d. Periodicity k and offset o may provide a starting slot and duration d may provide the number of consecutive slots where the SS set may be monitored starting from the slot identified by k and o. The mapping of PDCCH candidates of an SS set to CCEs of the associated CORESET may be implemented by means of a hash function. The hash function may randomize the allocation of the PDCCH candidates within a CORESET.

Physical downlink control channel transmission may be enhanced by considering repetition and possible beam diversity and/or hopping for the repeated transmissions of the DCI. For example, an association may be defined between two search space sets (SSSets) via radio resource control (RRC) level to link PDCCH candidates of the SSSets. The UE may then combine (e.g., soft combining or selection combining) PDCCH candidates of the SSSets associated with different or same CORESET(s). In certain embodiments, there may be one CORESET used with two or more SSSets.

A scheduling offset for scheduling PDSCH, physical uplink shared channel (PUSCH), channel state information-reference signal (CSI-RS), and/or sounding reference signal (SRS) given in the DCI directly or indirectly (indirectly, e.g., when triggering SRS resource set) defines the time offset between the DCI and the actual transmission of PDSCH, PUSCH, CSI-RS, and/or SRS. In certain embodiments, a scheduling offset may include a slot offset.

Furthermore, beam indication for PDSCH may depend on UE capability, e.g., it may be controlled by a quasi-co-location (QCL) parameter (e.g., timeDurationForQCL) provided by the UE. This parameter may define the minimum number of OFDM symbols used by the UE to perform PDCCH reception and apply spatial QCL information received in DCI for PDSCH processing. The UE may indicate one value per each subcarrier spacing of 60 kilohertz (kHz) and 120 kHz.

There may be several different cases for how the timeDurationForQCL parameter impacts PDSCH beam indication with different scheduling offsets (time between PDCCH scheduling the PDSCH and the PDSCH transmission). As one case, a transmit (TX) beam for PDSCH may be the same as for the PDCCH if the transmission configuration indicator present in DCI parameter (e.g., TCI-PresentInDCI) is set to 'Disabled' for the CORESET scheduling the PDSCH or if the PDSCH is scheduled by a DCI format 1_0 and a time offset between the reception of the DL DCI and the corresponding PDSCH is equal to or greater than a threshold provided by the timeDurationForQCL parameter. As another case, the TX beam for PDSCH may be indicated by a TCI in DCI if the parameter TCI-PresentInDCI is set to 'Enabled' and time offset between the reception of the DL DCI and the corresponding PDSCH is equal to or greater than a threshold provided by the timeDurationForQCL parameter. The threshold may be based on a reported UE capability. As another case, the TX beam for PDSCH may correspond to the PDCCH TX beam of the lowest CORESET-index (ID) in the latest slot in which one or more CORESETs are configured for the UE. This may be the case if the parameter TCI-PresentinDCI is set to 'Enabled' or 'Disabled' and the time offset between the reception of the DL DCI and the corresponding PDSCH is less than a threshold provided by the timeDurationForQCL parameter.

A similar principle may also be applied for aperiodic-CSI-RS (A-CSI-RS), where the applied QCL assumption for the reception of the A-CSI-RS may depend on the relationship between the scheduling offset and the UE-provided capability related to PDCCH decoding and beam adjustment latency, namely the beamSwitchTiming capability. The beamSwitchTiming capability may indicate the minimum number of OFDM symbols between the DCI triggering of A-CSI-RS and the A-CSI-RS transmission. The number of OFDM symbols may be measured from the last symbol containing the indication to the first symbol of CSI-RS. The UE may include this field for each supported sub-carrier spacing.

For repeated transmission of physical downlink control channel, there may be ambiguity at the UE in interpreting the detected DCI carrying scheduling of PDSCH, PUSCH, CSI-RS, and/or SRS, and there may be problems related to, e.g., how to avoid ambiguity in determining scheduling offset and QCL assumption to be applied when the DCI is transmitted in the PDCCH candidates of the associated SSSets. The UE may detect the DCI either in the initial PDCCH transmission or in the repeated PDCCH transmission, or in both. One problem may include, for example, how the relationship between the timeDurationForQCL parameter and the scheduling offset is defined in the case where the PDCCHs belonging to the associated SSSets (for repetition) are transmitted (and monitored) in the different slots. Similarly, triggering of an aperiodic reference signal (e.g., A-CSI-RS) with a physical downlink control signal (e.g. DCI) transmitted in repeated manner may introduce a similar problem.

Some embodiments described herein may provide for facilitating downlink control signal (e.g., DCI) repetition on linked PDCCH candidates of different search space sets and/or for repetition and/or beam diversity for the PDCCH transmissions. For example, certain embodiments may provide a procedure for the UE to determine a set of PDCCH candidates to determine the starting time and ending time instances for the PDCCH transmissions utilizing the repetition of the DCI. In some embodiments, the UE may determine a first set of PDCCH candidates for determining a scheduling order of scheduled UL transmissions (e.g., PUSCH), and/or a second set of PDCCH candidates for determining scheduling offset for a scheduled DL transmission (e.g., PDSCH). A scheduling order may include an order in time of initial and/or first transmission of transport blocks using PDSCH and/or PUSCH.

In certain embodiments, the UE may determine the set or the first and second sets based on a rule. For example, if PDCCH candidate set #a and PDCCH candidate set #b are associated, the rule may include that if the time from the monitoring occasion of PDCCH candidates of set #a (e.g., the first occasion in time for PDCCH candidates in set #a) to the occasion of PDCCH candidates of set #b (e.g., the first occasion in time for PDCCH candidates in set #b) is less than the time from the occasion of PDCCH candidates of set #b to occasion of PDCCH candidates of set #a, then the PDCCH candidates of the set #a may be determined as the first set, and/or the PDCCH candidates of the set #b may be determined as the second set. Otherwise, the PDCCH candidates of the set #b may be determined as the first set and/or PDCCH candidates of the set #a may be determined as the second set. The UE may use the starting time of the determined first set of PDCCH candidates to determine a correct order in PDCCH-PDSCH and PDCCH-PUSCH scheduling and/or in which correct order for the scheduled PDSCHs and scheduled PUSCHs, respectively. In some embodiments, the UE may determine multiple first sets (and/or corresponding second sets) over time. Then the order may be the order of the first sets in time (e.g., the UE may determine the first set in slot #2 and #4, where the PDSCH according to first set in slot #2 may be before PDSCH scheduled according to the first set in slot #4). The UE may use the determined starting time of the second set of PDCCH candidates to determine correct scheduling offset to be used for determining the QCL assumption for the PDSCH reception, effective scheduling offset for PDSCH, PUSCH, CSI-RS and SRS scheduling, and the correct scheduling offset to be used for determining the QCL assumption for the A-CSI-RS reception.

Additionally, or alternatively, in certain embodiments, the UE may determine the pair of first and second sets of PDCCH candidates for repeated PDCCH transmission to be valid if they are within a certain time window. The window may be configured to the UE, pre-defined, or determined based on a UE capability. For example, it may be specified and/or configured that the validity window for determining the valid pair of first and second sets of PDCCH candidates is two slots. Otherwise, the UE may determine that DCI is transmitted without repetition.

The figures discussed below may provide various examples of a procedure for the UE to determine first and second sets of PDCCH candidates. According to certain example embodiments, UE may determine a first set and a second set of PDCCH candidates from configured sets (e.g., set #a and set #b) of PDCCH candidates, the determined first set and second set may be used to determine which PDCCH candidates may carry the same control information (and which the UE may combine, e.g., with selection or soft combining, where the combining may be among PDCCH candidates of different search space sets) and also to determine correct timing assumptions and QCL assumptions for the PDSCH, PUSCH, A-CSI-RS, and/or SRS.

FIG. 1 illustrates a first example 100 of determining first and/or second set of PDCCH candidates, according to some embodiments. The first set and/or the second set is to be used for determining scheduling order and/or scheduling offset of scheduled data transmission(s) and/or reference signal transmission(s). In this example, PDCCH candidates of set #a and a PDCCH candidates of set #b are configured for the UE, and the set #a and set #b are associated for repeated PDCCH transmission. The UE may determine the first and/or second set based on a rule. For example, if the time, as illustrated at 102, from the monitoring occasion of PDCCH candidates of set #a to the occasion of PDCCH candidates of set #b is less than time from the occasion of PDCCH candidates of set #b to the occasion of PDCCH candidates of set #a, then the PDCCH candidates of the set #a may be determined to be the first set and/or PDCCH candidates of the set #b may be determined to be the second set. Otherwise, the PDCCH candidates of the set #b may be the first set and/or PDCCH candidates of the set #a may be the second set.

As described above, FIG. 1 is provided as an example. Other examples are possible, according to some embodiments.

Figure 2:
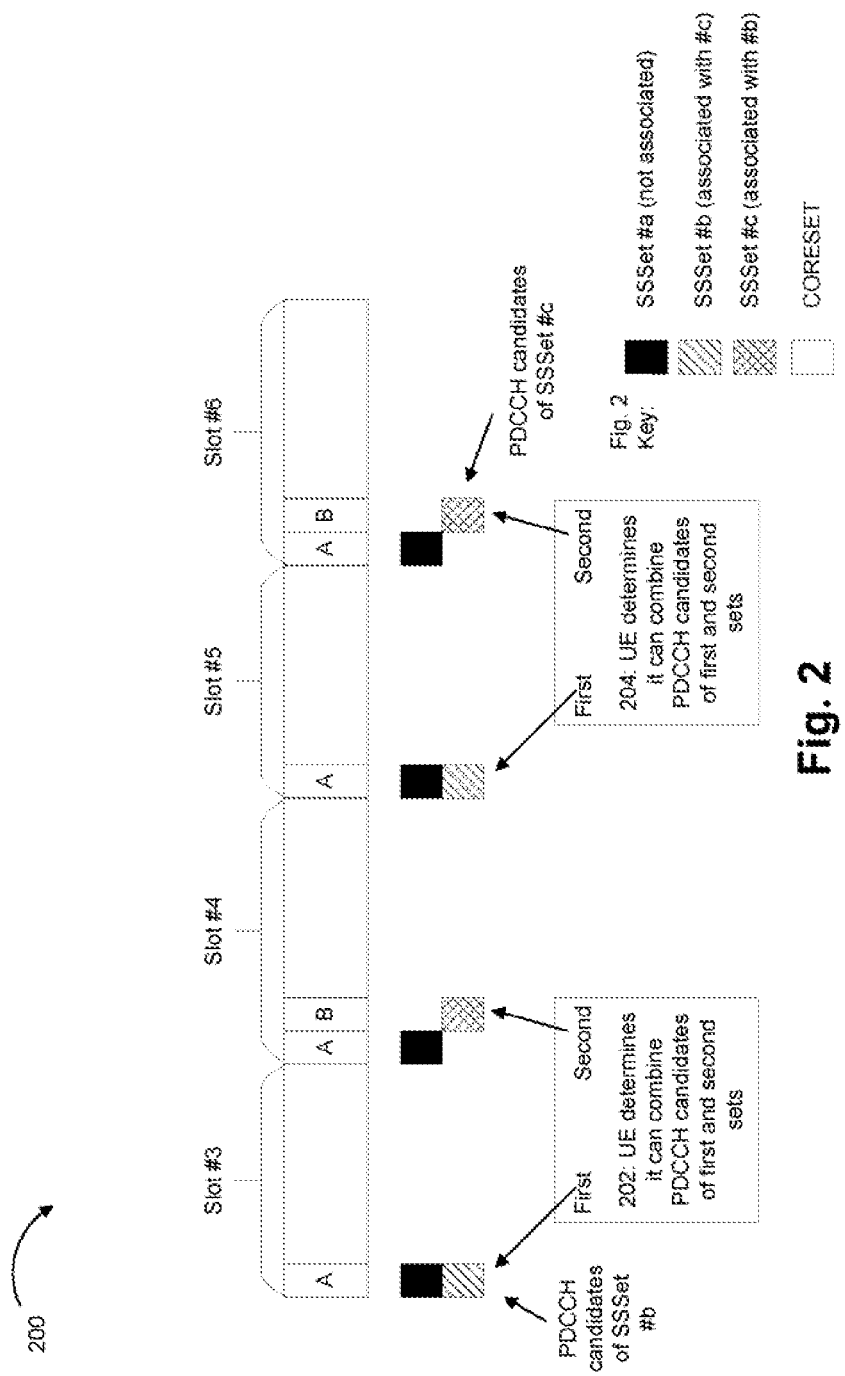
FIG. 2 illustrates a second example of determining first and second sets of PDCCH candidates, according to some embodiments.

FIG. 2 illustrates a second example 200 of determining first and/or second set of PDCCH candidates, according to some embodiments. The UE may determine the first set of PDCCH candidates being the set with the lower SSSet index (ID), and/or the second set of PDCCH candidates being the one with the higher SSSet ID. In the example 200, the associated SSSets configured for the UE are SSSets #b and #c, and the SSSet #b may be associated with CORESET A. In the example 200, the SSSet #c may be associated with CORESET B. The periodicity for PDCCH candidates of SSSet #a may be every slot, and every second slot for PDCCH candidates of SSSets #b and #c but with different offsets (e.g., for PDCCH in a period). In this example, assuming SSSet #b has an index value lower than that of SSSet #c, then SSSet #b is determined to be the first set and SSSet #c is determined to be the second set. As illustrated at 202, the UE may determine that it can combine PDCCH candidates of the first and second sets, which are in slots #3 and #4, respectively. Similarly, as illustrated at 204, the UE may determine that it can combine PDCCH candidates of the first and second sets, which are in slots #5 and #6, respectively. The associated sets may be required to be within a certain time window to make the PDCCH candidates combinable, in some embodiments. In addition, the UE may determine a scheduling order of data transmission (e.g., PUSCH) scheduled by PDCCH candidates in SSSet #b and SSSet #c based on the determined first set, and/or may determine scheduling offset of data transmission (e.g., PDSCH) scheduled by PDCCH candidates in SSSet #b and SSSet #c based on the determined second set.

As indicated above, FIG. 2 is provided as an example. Other examples are possible, according to some embodiments.

Figure 3:
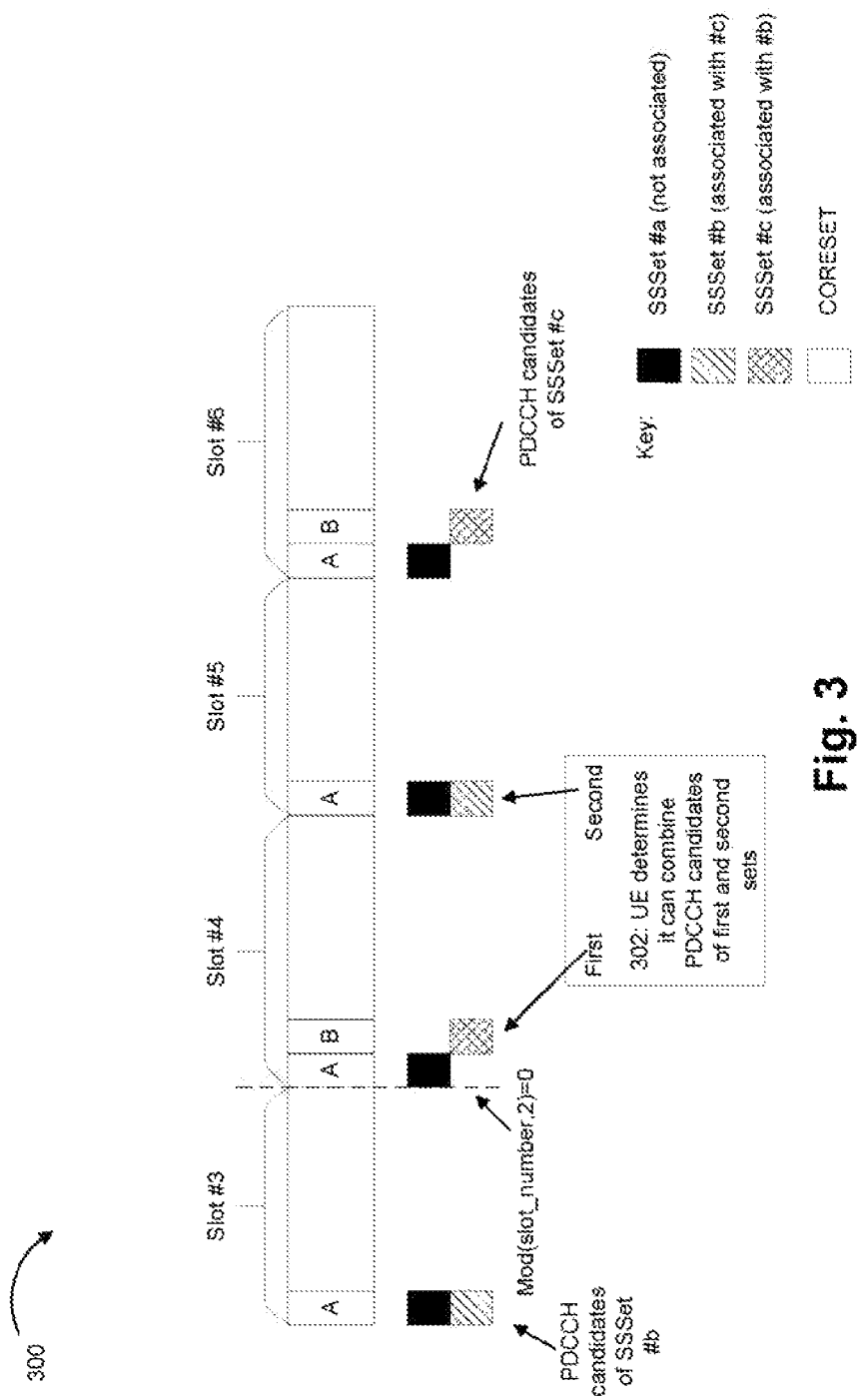
FIG. 3 illustrates a third example of determining first and second sets of PDCCH candidates, according to some embodiments.

FIG. 3 illustrates a third example 300 of determining first and second sets of PDCCH candidates, according to some embodiments. The UE may determine the order of the sets (e.g., which is the first set and which is the second set) based on the slot number. For example, a calculation of mod (slot_number, 2)=0 may be used. In this case, the UE may determine the first set of PDCCH candidates from the SSSet of which the monitoring occasion comes first after the beginning of the slot number fulfilling the calculation mod (slot_number, 2)=0. In the example 300, a validity window (e.g., two slots) may be used for determining the first and second sets of PDCCH candidates. Sets of PDCCH candidates within the validity window are considered valid for repeated transmission. Furthermore, in the example 300, the associated SSSets may be SSSets #b and #c, where the SSSet #b may be associated with CORESET A, and the SSSet #c may be associated with CORESET B. Since the monitoring occasion of SSSet #c comes first after the beginning of the slot number fulfilling the calculation mod (slot_number, 2)=0, it is determined to be the first set and SSSet #b is determined to be the second set in this example. As illustrated at 302, the UE may determine that it can combine PDCCH candidates of the first and second sets.

Alternatively, or additionally, the UE may determine the order from the slot number by using, e.g., the calculation mod(slot_number, 2)=1. In this case, the UE may determine the first set of PDCCH candidates from the SSSet of which the monitoring occasion comes first after the beginning of the slot number, fulfilling the calculation mod(slot_number, 2)=1.

As described above, FIG. 3 is provided as an example. Other examples are possible, according to some embodiments.

Certain embodiments with respect to a fourth example may be suitable for sub-slot PDCCH repetition. The UE may be configured with a number of sub-slots (e.g., 2 sub-slots of 7 OFDM symbols each, or 7 sub-slots of 2 symbols each) within a slot, and the UE may apply similar operations described with respect to, or illustrated in, FIG. 3, but on a sub-slot level. The UE may determine the order of sets (e.g., which set is the first set and which is the second set) from the sub-slot number by using a calculation. For example, the calculation may include mod(sub-slot_number, 2)=0 or mod (sub-slot_number, 2)=1, where the sub-slots may be indexed or numbered starting, e.g., from 0 or 1. For instance, the UE may determine the first set of PDCCH candidates being from the SSSet of which monitoring occasion comes or starts first after the beginning of the sub-slot number fulfilling a calculation. For example, the calculation may include mod (sub-slot_number, 2)=0.

Certain embodiments with respect to a fifth example may be used, e.g., for PDCCH repetitions having the same starting symbol within a slot. The UE may determine the first set of PDCCH candidates based on the sets having the starting PRB or starting CCE (or, alternatively, CCE with lowest index) mapped first and second in the frequency domain, with the lower SSSet ID and correspondingly the second set of PDCCH candidates, being the set with the higher SSSet ID.

The UE may determine an effective scheduling offset (e.g., the time when the scheduled transmission, such as PDSCH, PUSCH, CSI-RS, or etc., takes place) from the monitoring occasion of the PDCCH candidates of the determined second SSSet in various cases. For example, the cases may include a first case where the UE detects successfully PDCCH in the monitoring occasion of the PDCCH candidates of the first SSSet. As another example, the cases may include a second case where the UE may successfully detect PDCCH in the monitoring occasion of the PDCCH candidates of the second SSSet. In other words, in the DCI transmitted on PDCCH candidates of the associated SSSets, the scheduling offset (e.g., the time between DCI and start of the allocated PDSCH) may be defined from the monitoring occasion of the PDCCH candidates of the second SSSet. Similar aspects may be applied for the PUSCH, CSI-RS, and SRS effective scheduling offset determination. Alternatively, the UE may determine the scheduling offset from the monitoring occasion of the PDCCH candidate of the determined first SSSet.

With respect to QCL assumption determination for PDSCH reception, upon detection of the DL grant (PDSCH allocation), the UE may compare the above-determined scheduling offset to the timeDurationForQCL parameter (PDSCH allocation) and may apply one or more rules. The one or more rules may control that the TX beam for PDSCH is the same as for the CORESET used to transmit PDCCH corresponding to the "first" set of PDCCH candidates. This rule may be applied if the TCI-PresentInDCI parameter is set to 'disabled' for both CORESETs (associated with the linked SSSets) scheduling the PDSCH. Alternatively, the rule may be applied if the PDSCH is scheduled by a DCI format 1_0 and the determined scheduling offset between the occasion of the second set of PDCCH candidates and the corresponding PDSCH is equal to or greater than a threshold provided for the timeDurationforQCL parameter.

Another example rule may control that the TX beam for PDSCH is indicated by the TCI index in the DCI. This rule may apply if the TCI-PresentInDCI parameter is set to 'enabled' for both CORESETs (associated with the linked SSSets) scheduling the PDSCH and the determined scheduling offset between the occasion of the second set of PDCCH candidates and the corresponding PDSCH is equal to or greater than a threshold provided by the timeDurationforQCL parameter. The threshold may be based on a reported UE capability.

Another example rule may control that the TX beam for PDSCH corresponds to the PDCCH TX beam of the lowest CORESET-ID in the latest slot in which one or more CORESETs are configured for the UE. This rule may apply if the TCI-PresentInDCI parameter is set to 'disabled' or 'enabled' for both CORESETs (associated to the linked SSSets) scheduling the PDSCH and the determined scheduling offset between the occasion of the second set of PDCCH candidates and the corresponding PDSCH is less than a threshold provided by the timeDurationforQCL parameter.

Figure 4:
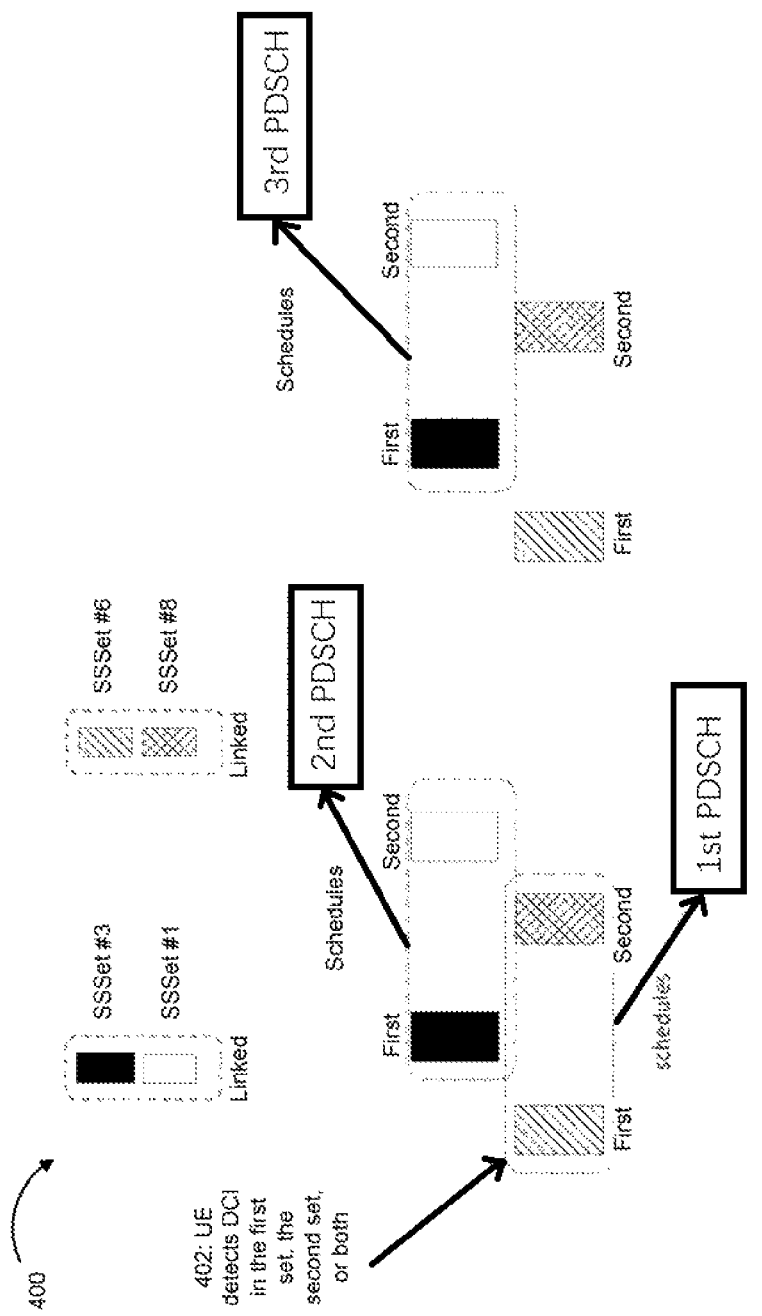
FIG. 4 illustrates an example of determining an order of physical downlink shared channels (PDSCHs) based on an order of first sets of PDCCH candidates, according to some embodiments.

FIG. 4 illustrates an example 400 of determining an order of physical downlink shared channels (PDSCHs) based on an order of first sets of PDCCH candidates, according to some embodiments. For example, the example 400 may illustrate certain embodiments for determining correct PDCCH-PDSCH order (and/or PDCCH-PUSCH order) (e.g., to determine the correct order for the scheduled PDSCHs from multiple linked SSSet pairs). The UE may determine the order for the scheduled PDSCHs based on the time occasion of the determined first set of PDCCH candidates. If there are multiple simultaneous first sets of PDCCH candidates, the SSSet with the lower index value may be determined to be first set in the order of first sets. For example, there may be multiple first sets in the case of continuous PDSCH scheduling, where the order of the first sets may also control the order of PDSCH payloads or transport blocks transmitted on PDSCH. This is illustrated in FIG. 4, where the order of PDSCHs (1st PDSCH, 2nd PDSCH, 3rd PDSCH) may be determined based on the order of the first sets. In this example, as illustrated at 402, the UE may detect DCI in the first set, the second set, or both.

As described above, FIG. 4 is provided as an example. Other examples are possible, according to some embodiments.

Figure 5:
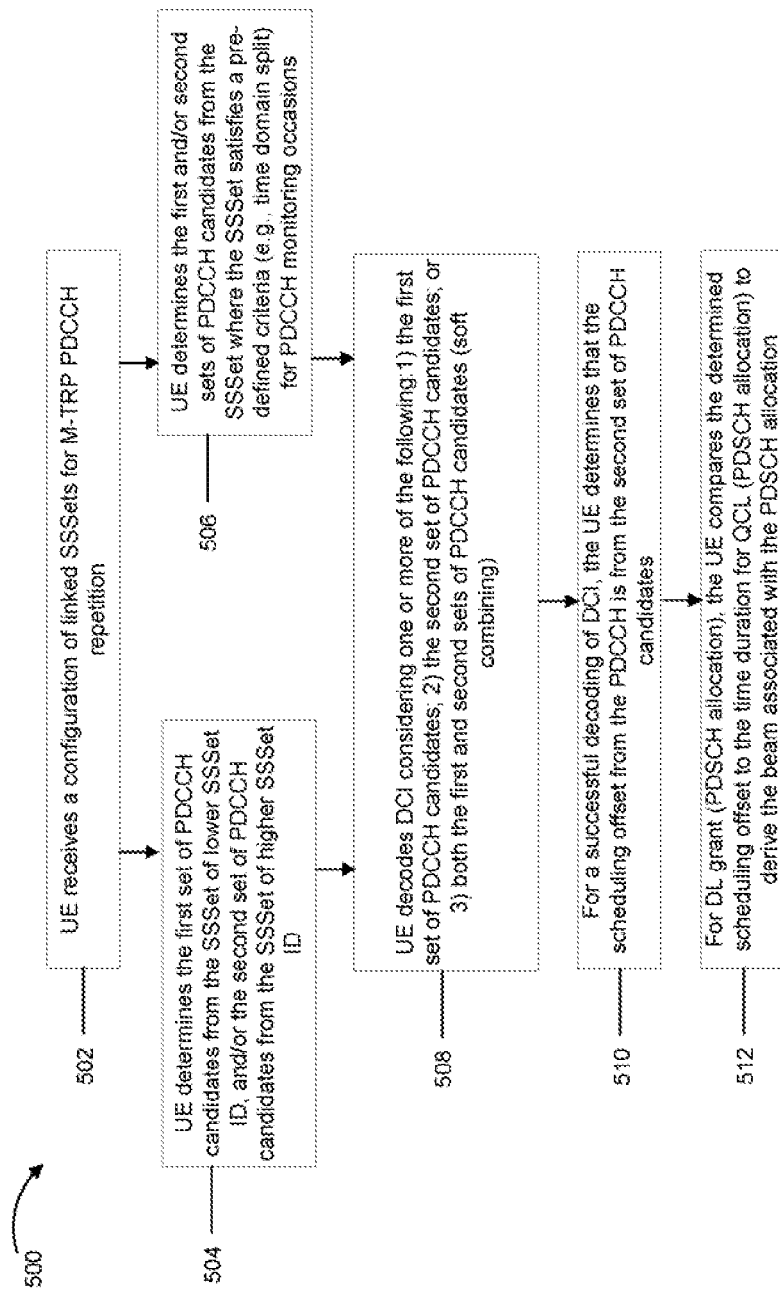
FIG. 5 illustrates an example flow diagram of a method of UE operations considering PDSCH signaling, according to some embodiments.

FIG. 5 illustrates an example flow diagram of a method 500 of UE operations considering PDSCH scheduling, according to some embodiments. As illustrated at 502, the method 500 may include the UE receiving a configuration of linked SSSets for multi-TRP (M-TRP) PDCCH repetition. As illustrated at 504, the UE may determine the first set of PDCCH candidates from the SSSet of lower SSSet ID, and/or the second set of PDCCH candidates from the SSSet of higher SSSet ID. The operations illustrated at 504 may be similar to aspects of the example 200 of FIG. 2. Alternatively, as illustrated at 506, the UE may determine the first and/or second sets of PDCCH candidates from the SSSet where the SSSet may satisfy a pre-defined criteria (e.g., time domain split) for PDCCH monitoring occasions. As an example, the operations illustrated at 506 may be similar to aspects of the example 300 of FIG. 3.

As illustrated at 508, the UE may decode DCI considering one or more of the following: 1) the first set of PDCCH candidates; 2) the second set of PDCCH candidates; or 3) both the first and second sets of PDCCH candidates (soft combining). As illustrated at 510, for a successful decoding of DCI, the UE may determine that the scheduling offset from the PDCCH is from the second set of PDCCH candidates. As illustrated at 512, for a DL grant (PDSCH allocation), the UE may compare the determined scheduling offset to the time duration for QCL (PDSCH allocation) to derive the beam associated with the PDSCH allocation.

As described above, FIG. 5 is provided as an example. Other examples are possible, according to some embodiments.

Figure 6:
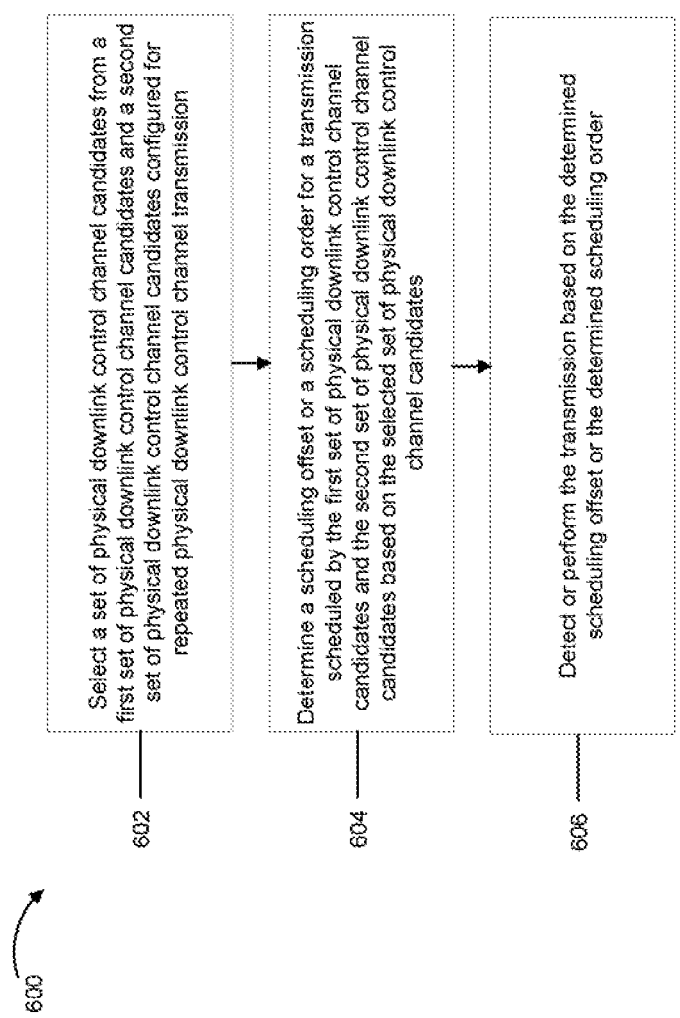
FIG. 6 illustrates an example flow diagram of a method, according to some embodiments.

FIG. 6 illustrates an example flow diagram of a method 600, according to some embodiments. For example, FIG. 6 may illustrate example operations of a UE (e.g., apparatus 20 illustrated in, and described with respect to, FIG. 7b). Some of the operations illustrated in FIG. 6 may be similar to some operations shown in, and described with respect to, FIGS. 1-5.

In an embodiment, the method may include, at 602, selecting a set of physical downlink control channel candidates from a first set of physical downlink control channel candidates and a second set of physical downlink control channel candidates configured for repeated physical downlink control channel transmission. For example, the first set and the second set may correspond to SSSet #a and SSSet #b in FIG. 1 (or SSSet #b and SSSet #c in FIG. 2), respectively, that were described above, whereas the selected set may correspond to the determined first set or second set described above. The method may include, at 604, determining a scheduling offset or a scheduling order for a transmission (e.g., data transmission such as PDSCH or PUSCH, or reference signal transmission such as A-CSI-RS) scheduled by the first set of physical downlink control channel candidates and the second set of physical downlink control channel candidates based on the selected set of physical downlink control channel candidates. For instance, the UE may determine a scheduling order for scheduled PDSCH based on a starting time instance for the selected set of PDCCH candidates. In some embodiments, the UE may select more than one set of PDCCH candidates. For example, for determining the scheduling offset, the UE may select the second set, while for determining the scheduling order, the UE may select the first set.

The method may include, at 606, detecting or performing the transmission (e.g., data transmission) based on the determined scheduling offset or the determined scheduling order. In some embodiments, the selecting at 602 may be based on an index of a search space set for detecting the first set of physical downlink control channel candidates and an index of a search space set for detecting the second set of physical downlink control channel candidates. For example, this may be performed in a manner similar to that described with respect to the second example 200 of FIG. 2. Additionally, or alternatively, the selecting at 602 may be based on an index of a control resource set (e.g., CORESET) for detecting the first set of physical downlink control channel candidates and an index of a control resource set for detecting the second set of physical downlink control channel candidates. For example, this may be performed in a manner similar to that described with respect to the second example 200 of FIG. 2.

Additionally, or alternatively, the selecting at 602 may be based on a time from a monitoring occasion of the first set of physical downlink control channel candidates to a following monitoring occasion of the second set of physical downlink control channel candidates and a time from a monitoring occasion of the second set of physical downlink control channel candidates to a following monitoring occasion of the first set of physical downlink control channel candidates. For example, this may be performed in a manner similar to that described with respect to the first example 100 of FIG. 1. Additionally, or alternatively, the selecting at 602 may be based on an order in time for a monitoring occasion of the first set of physical downlink control channel candidates and a monitoring occasion of the second set of physical downlink control channel candidates within a given time window. For example, this may be performed in a manner similar to that described with respect to the third example 300 of FIG. 3 and/or the fourth example described after the description for FIG. 3.

Additionally, or alternatively, the selecting at 602 may be based on an index of a starting resource for detecting the first set of physical downlink control channel candidates and an index of a starting resource for detecting the second set of physical downlink control channel candidates. For example, this may be performed in a manner similar to that described with respect to the fifth example described before the description for FIG. 4.

The method illustrated in FIG. 6 may include one or more additional aspects described below or elsewhere herein. In some embodiments, the selecting at 602 may include selecting the first set for determining the scheduling order or selecting the second set for determining the scheduling offset based on the index of the search space set for detecting the first set being a lower value compared to the index of the search space set for detecting the second set. In some embodiments, the selecting at 602 may include selecting the first set based on the index of the control resource set for detecting the first set being a lower value compared to the index of the control resource set for detecting the second set. In some embodiments, the selecting at 602 may include selecting the first set based on the time from the monitoring occasion of the first set to the following monitoring occasion of the second set being less than the time from the monitoring occasion of the second set to the following monitoring occasion of the first set. In some embodiments, the selecting at 602 may include selecting the first set based on the monitoring occasion of the first set being earlier compared to the monitoring occasion of the second set within the given time window.

In some embodiments, the selecting at 602 may include selecting the first set based on the index of the starting resource for detecting the first set being a higher value compared to the index of the starting resource for detecting the second set. In some embodiments, the selecting at 602 may include selecting the first set based on the index of the starting resource for detecting the first set being a lower value compared to the index of the starting resource for detecting the second set. In some embodiments, the method 600 may further include determining a quasi-co-location assumption for the transmission (e.g., data transmission) based on the determined scheduling offset. In some embodiments, the method 600 may further include determining that the first and second set are valid for repeated physical downlink control channel transmission, and the selecting at 602 may be performed based on the validity determination. In certain embodiments, the determining at 604 may include determining the scheduling offset or the scheduling order based on a starting time instance for the selected set. Method 600 may reduce or eliminate the need to explicitly configure the order of search space sets, along with other benefits described elsewhere herein.

As described above, FIG. 6 is provided as an example. Other examples are possible according to some embodiments.

In some embodiments, the method of FIG. 6 may be performed by a network node (e.g., apparatus 10 of FIG. 7a). For example, the network node may configure sets of PDCCH candidates for UEs, and may select a set of PDCCH candidates from the configured set for determining a scheduling offset or a scheduling order for at least one scheduled transmission. The network node may use the determined scheduling offset or scheduling order for transmitting the scheduled transmission (e.g., PDSCH or RS) to a UE, or for detecting the scheduled transmission (e.g., PUSCH) from the UE.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of Global System for Mobile Communications (GSM), narrow band (NB)-IoT, LTE, 5G, Wireless Local Area Network (WLAN), Bluetooth (BT), BT-low energy (LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or radio access network (RAN) node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-6.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as Orthogonal Frequency-Division Multiple Access (OFDMA) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-6. For instance, in one embodiment, apparatus 20 may be controlled by memory 24 and processor 22 to perform the method of FIG. 6.

In some embodiments, an apparatus (e.g., apparatus 10 and/or apparatus 20) may include means for performing a method or any of the variants discussed herein, e.g., a method described with reference to FIG. 6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reduction or elimination of explicit configuration of the order of SSSets. In addition, other benefits of some example embodiments include allowance of multi-TRP PDCCH repetition towards the UE, and allowance of the UE to perform selection or combined decoding while still providing the possibility to derive scheduling offset with a given reference. The derived scheduling offset can be easily compared with the time duration for QCL to derive the beam associated with the PDSCH. This may provide for simple and easy to implementation. Accordingly, the use of some example embodiments results in improved functioning of communications networks and their nodes and, therefore constitute an improvement at least to the technological field of DCI repetition, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

CORESET Control Resource Set
DCI Downlink Control Information
DL Downlink
FR Frequency Range
gNB 5G Node B
PDCCH Physical Downlink Control Channel
PDSCH Physical Downlink Shared Channel
PUSCH Physical Uplink Shared Channel
QCL Quasi co-location
RS Reference Signal
RX Receive
SS Search Space
SSSet Search Space Set
TCI Transmission Configuration Indicator
TRP Transmission and Reception Point
TX Transmit
UE User Equipment
UL Uplink

We claim:

1. A method, comprising:
selecting, by a device, a set of physical downlink control channel candidates from a first set of physical downlink control channel candidates and a second set of physical downlink control channel candidates configured for repeated physical downlink control channel transmission;
determining a scheduling offset or a scheduling order for a transmission scheduled by a downlink control information in the first set of physical downlink control channel candidates and the second set of physical downlink control channel candidates based on the selected set of physical downlink control channel candidates;
detecting or performing the transmission based on the determined scheduling offset or the determined scheduling order,
wherein the selecting is based on at least one of:
an index of a search space set for detecting the first set of physical downlink control channel candidates and an index of a search space set for detecting the second set of physical downlink control channel candidates,
an index of a control resource set for detecting the first set of physical downlink control channel candidates and an index of a control resource set for detecting the second set of physical downlink control channel candidates,
a time from a monitoring occasion of the first set of physical downlink control channel candidates to a following monitoring occasion of the second set of physical downlink control channel candidates and a time from a monitoring occasion of the second set of physical downlink control channel candidates to a following monitoring occasion of the first set of physical downlink control channel candidates,
an order in time for a monitoring occasion of the first set of physical downlink control channel candidates and a monitoring occasion of the second set of physical downlink control channel candidates within a given time window, or
an index of a starting resource for detecting the first set of physical downlink control channel candidates and an index of a starting resource for detecting the second set of physical downlink control channel candidates; and
determining a quasi-co-location assumption for the transmission based on the determined scheduling offset.

2. The method according to claim 1, wherein the selecting comprises:
selecting the first set for determining the scheduling order or selecting the second set for determining the scheduling offset, based on the index of the search space set for detecting the first set being a lower value compared to the index of the search space set for detecting the second set.

3. The method according to claim 1, wherein the selecting comprises:
selecting the first set based on the index of the control resource set for detecting the first set being a lower value compared to the index of the control resource set for detecting the second set.

4. The method according to claim 1, wherein the selecting comprises:
selecting the first set based on the monitoring occasion of the first set being earlier compared to the monitoring occasion of the second set within the given time window.

5. The method according to claim 1, wherein the selecting comprises:
selecting the first set based on the index of the starting resource for detecting the first set being a higher value compared to the index of the starting resource for detecting the second set.

6. The method according to claim 1, wherein the selecting comprises:
selecting the first set based on the index of the starting resource for detecting the first set being a lower value compared to the index of the starting resource for detecting the second set.

7. The method according to claim 1, further comprising:
determining that the first set and the second set are valid for repeated physical downlink control channel transmission; and
wherein the selecting is performed based on the validity determination.

8. The method according to claim 1, wherein the determining of the scheduling offset or the scheduling order is based on a starting time instance for the selected set.

9. An apparatus, comprising:
at least one processor; and
at least one memory comprising computer program code,
the at least one memory and computer program code configured, with the at least one processor, to cause the apparatus at least to:
select a set of physical downlink control channel candidates from a first set of physical downlink control channel candidates and a second set of physical downlink control channel candidates configured for repeated physical downlink control channel transmission;
determine a scheduling offset or a scheduling order for a transmission scheduled by a downlink control information in the first set of physical downlink control channel candidates and the second set of physical downlink control channel candidates based on the selected set of physical downlink control channel candidates; and
detect or perform the transmission based on the determined scheduling offset or the determined scheduling order,
wherein the selecting is based on at least one of:
an index of a search space set for detecting the first set of physical downlink control channel candidates and an index of a search space set for detecting the second set of physical downlink control channel candidates, an index of a control resource set for detecting the first set of physical downlink control channel candidates and an index of a control resource set for detecting the second set of physical downlink control channel candidates, a time from a monitoring occasion of the first set of physical downlink control channel candidates to a following monitoring occasion of the second set of physical downlink control channel candidates and a time from a monitoring occasion of the second set of physical downlink control channel candidates to a following monitoring occasion of the first set of physical downlink control channel candidates, an order in time for a monitoring occasion of the first set of physical downlink control channel candidates and a monitoring occasion of the second set of physical downlink control channel candidates within a given time window, or an index of a starting resource for detecting the first set of physical downlink control channel candidates and an index of a starting resource for detecting the second set of physical downlink control channel candidates; and determine a quasi-co-location assumption for the transmission based on the determined scheduling offset.

10. The apparatus according to claim 9, wherein the selecting further comprising:

selecting the first set for determining the scheduling order or selecting the second set for determining the scheduling offset, based on the index of the search space set for detecting the first set being a lower value compared to the index of the search space set for detecting the second set.

11. The apparatus according to claim 9, wherein the selecting further comprising:

selecting the first set based on the index of the control resource set for detecting the first set being a lower value compared to the index of the control resource set for detecting the second set.

12. The apparatus according to claim 9, wherein the selecting further comprising:

selecting the first set based on the time from the monitoring occasion of the first set to the following monitoring occasion of the second set being less than the time from the monitoring occasion of the second set to the following monitoring occasion of the first set.

13. The apparatus according to claim 9, wherein the selecting further comprising:

selecting the first set based on the monitoring occasion of the first set being earlier compared to the monitoring occasion of the second set within the given time window.

14. The apparatus according to claim 9, wherein the selecting further comprising:

selecting the first set based on the index of the starting resource for detecting the first set being a higher value compared to the index of the starting resource for detecting the second set.

15. The apparatus according to claim 9, wherein the selecting further comprising:

selecting the first set based on the index of the starting resource for detecting the first set being a lower value compared to the index of the starting resource for detecting the second set.

16. The apparatus according to claim 9, wherein the at least one memory and the computer program code are further configured to, with the at least one processor, cause the apparatus to:

determine that the first set and the second set are valid for repeated physical downlink control channel transmission; and wherein the selecting is performed based on the validity determination.

17. The apparatus according to claim 9, wherein the determining of the scheduling offset or the scheduling order is based on a starting time instance for the selected set.

18. A non-transitory computer readable medium comprising program instructions stored thereon, which when executed by an apparatus, cause the apparatus at least to:

select a set of physical downlink control channel candidates from a first set of physical downlink control channel candidates and a second set of physical downlink control channel candidates configured for repeated physical downlink control channel transmission;

determine a scheduling offset or a scheduling order for a transmission scheduled by a downlink control information in the first set of physical downlink control channel candidates and the second set of physical downlink control channel candidates based on the selected set of physical downlink control channel candidates; and detect or perform the transmission based on the determined scheduling offset or the determined scheduling order, wherein the selecting is based on at least one of:

an index of a search space set for detecting the first set of physical downlink control channel candidates and an index of a search space set for detecting the second set of physical downlink control channel candidates, an index of a control resource set for detecting the first set of physical downlink control channel candidates and an index of a control resource set for detecting the second set of physical downlink control channel candidates, a time from a monitoring occasion of the first set of physical downlink control channel candidates to a following monitoring occasion of the second set of physical downlink control channel candidates and a time from a monitoring occasion of the second set of physical downlink control channel candidates to a following monitoring occasion of the first set of physical downlink control channel candidates, an order in time for a monitoring occasion of the first set of physical downlink control channel candidates and a monitoring occasion of the second set of physical downlink control channel candidates within a given time window, or an index of a starting resource for detecting the first set of physical downlink control channel candidates and an index of a starting resource for detecting the second set of physical downlink control channel candidates; and determine a quasi-co-location assumption for the transmission based on the determined scheduling offset.

* * * * *